US012084036B2

(12) United States Patent
Matsubara et al.

(10) Patent No.: US 12,084,036 B2
(45) Date of Patent: Sep. 10, 2024

(54) CONTROL APPARATUS FOR VEHICLE

(71) Applicants: TOYOTA JIDOSHA KABUSHIKI KAISHA, Toyota (JP); AISIN CORPORATION, Kariya (JP)

(72) Inventors: Keigo Matsubara, Nagoya (JP); Masayuki Baba, Toyota (JP); Tomoya Inayoshi, Kariya (JP)

(73) Assignees: TOYOTA JIDOSHA KABUSHIKI KAISHA, Toyota (JP); AISIN CORPORATION, Kariya (JP)

(*) Notice: Subject to any disclaimer, the term of this patent is extended or adjusted under 35 U.S.C. 154(b) by 263 days.

(21) Appl. No.: 17/876,943

(22) Filed: Jul. 29, 2022

(65) Prior Publication Data

US 2023/0038261 A1   Feb. 9, 2023

(30) Foreign Application Priority Data

Aug. 6, 2021 (JP) .................................. 2021-130298

(51) Int. Cl.
*B60W 10/02* (2006.01)
*B60W 10/06* (2006.01)
(Continued)

(52) U.S. Cl.
CPC ............ *B60W 10/02* (2013.01); *B60W 10/06* (2013.01); *B60W 10/08* (2013.01); *B60W 10/10* (2013.01);
(Continued)

(58) Field of Classification Search
CPC ...... B60W 10/02; B60W 10/06; B60W 10/08; B60W 10/10; B60W 20/10; B60W 30/192;
(Continued)

(56) References Cited

U.S. PATENT DOCUMENTS

2003/0073540 A1   4/2003  Eguchi et al.
2015/0367842 A1*  12/2015 Nakanishi ........... B60W 30/192
                                                    701/22

FOREIGN PATENT DOCUMENTS

JP   2003-120357 A   4/2003
JP   2017-140939 A   8/2017

* cited by examiner

*Primary Examiner* — Rodney A Butler
(74) *Attorney, Agent, or Firm* — Oliff PLC

(57) ABSTRACT

A vehicle control apparatus output a packing hydraulic-pressure command value and a cranking hydraulic-pressure command value higher than the packing hydraulic-pressure command value. The packing hydraulic-pressure command value is outputted to place a clutch in a pack-clearance-elimination completion state in a process of switching of the clutch from a released state to an engaged state. The cranking hydraulic-pressure command value is outputted, after elapse of a predetermined time required to place the clutch in the pack-clearance-elimination completion state, to cause the clutch to transmit a cranking torque required by a cranking by which a rotational speed of an engine is increased. In a case in which it is determined that a request to increase a vehicle power performance during output of the packing hydraulic-pressure command value, the cranking hydraulic-pressure command value is outputted in place of the packing hydraulic-pressure command value even before the elapse of the predetermined time.

12 Claims, 5 Drawing Sheets

(51) Int. Cl.
    *B60W 10/08* (2006.01)
    *B60W 10/10* (2012.01)
    *B60W 20/10* (2016.01)
    *F16D 48/06* (2006.01)
    *B60W 30/192* (2012.01)

(52) U.S. Cl.
    CPC ........... *B60W 20/10* (2013.01); *F16D 48/066* (2013.01); *B60W 30/192* (2013.01); *B60W 2510/0208* (2013.01); *B60W 2510/0638* (2013.01); *B60W 2710/021* (2013.01); *B60W 2710/1005* (2013.01); *F16D 2500/1026* (2013.01); *F16D 2500/10412* (2013.01)

(58) Field of Classification Search
    CPC . B60W 2510/0208; B60W 2510/0638; B60W 2710/021; B60W 2710/1005; B60W 2710/027; B60W 20/40; F16D 48/066; F16D 2500/1026; F16D 2500/10412; B60K 2006/4825; B60K 6/48; B60K 2006/268; B60K 6/26; Y02T 10/62
    See application file for complete search history.

CONTROL APPARATUS FOR VEHICLE

This application claims priority from Japanese Patent Application No. 2021-130298 filed on Aug. 6, 2021, the disclosure of which is herein incorporated by reference in its entirety.

FIELD OF THE INVENTION

The present invention relates to a control apparatus for a vehicle that includes an engine, an electric motor and a clutch provided between the engine and the electric motor.

BACKGROUND OF THE INVENTION

There is well-known a control apparatus for a vehicle that includes: an engine; drive wheels; an electric motor connected to a power transmission path between the engine and the drive wheels, in a power transmittable manner; a clutch disposed between the engine and the electric motoring the power transmission path; and a hydraulic control unit configured to supply a regulated hydraulic pressure that is to be used for switching an operation state of the clutch. A vehicle-operation control apparatus disclosed in JP2017-140939A is an example of such a control apparatus. This Japanese Patent Application Publication teaches that, when the engine is to be started, the clutch is switched to an engaged state, and a part of an output torque of the electric motor is applied to a crank shaft of the engine through the clutch, so that the applied part of the output torque of the electric motor serves as a cranking torque required to increase a rotational speed of the engine. The Japanese Patent Application Publication teaches also that, after elapse of a predetermined time that is required to place the clutch into a certain state in which the clutch can transmit at least a predetermined value of the torque, a fuel is supplied to the engine, and the engine is ignited while being cranked, whereby the engine is placed into an operated state.

SUMMARY OF THE INVENTION

By the way, where the engine is cranked after elapse of the predetermined time, when the engine is to be started, as in the control apparatus disclosed in the above-identified Patent Application Publication, the cranking of the engine cannot be made until the predetermined time elapses, so that it could take time to obtain a desired output of the vehicle.

The present invention was made in view of the background art described above. It is therefore an object of the present invention to provide a vehicle control apparatus capable of reducing a time required to obtain a desired output of the vehicle when the engine is started.

The object indicated above is achieved according to the following aspects of the present invention.

According to a first aspect of the invention, there is provided a control apparatus for a vehicle that includes: an engine; drive wheels; an electric motor connected to a power transmission path between the engine and the drive wheels, in a power transmittable manner; a clutch disposed between the engine and the electric motor in the power transmission path; and a hydraulic control unit configured to supply a regulated hydraulic pressure that is to be used for switching an operation state of the clutch, the control apparatus comprising: a clutch control portion that is configured, when the engine is to be started, to output a packing hydraulic-pressure command value and a cranking hydraulic-pressure command value that is higher than the packing hydraulic-pressure command value, such that the packing hydraulic-pressure command value is outputted to the hydraulic control unit, for regulating the hydraulic pressure so as to place the clutch in a pack-clearance-elimination completion state in which a pack clearance of the clutch has been eliminated, in a process of switching of the operation state of the clutch from a released state to an engaged state, and such that the cranking hydraulic-pressure command value is outputted to the hydraulic control unit, after elapse of a predetermined time required to place the clutch in the pack-clearance-elimination completion state, for regulating the hydraulic pressure so as to cause the clutch to transmit a cranking torque required by a cranking by which a rotational speed of the engine is increased, and an engine-start control portion that is configured, when the engine is to be started, to control the electric motor for causing the electric motor to output the cranking torque, and to control the engine for starting the engine, wherein the clutch control portion is configured, in a case in which it is determined that the cranking is required by a request requesting an increase of a power performance of the vehicle during output of the packing hydraulic-pressure command value, to output the cranking hydraulic-pressure command value in place of the packing hydraulic-pressure command value even before the elapse of the predetermined time.

For example, the clutch includes a first member that is to be rotated with rotation of the engine and a second member that is to be rotated with rotation of the electric motor, such that a clearance between the first and second members of the clutch is eliminated when the clutch is placed in the pack-clearance-elimination completion state.

According to a second aspect of the invention, in the control apparatus according to the first aspect of the invention, the clutch control portion is configured, in a case in which the cranking hydraulic-pressure command value is outputted before the elapse of the predetermined time, to output a surge hydraulic-pressure command value that is higher than the cranking hydraulic-pressure command value, such that the surge hydraulic-pressure command value is outputted to the hydraulic control unit temporarily upon initiation of output of the cranking hydraulic-pressure command value, for increasing responsiveness of the hydraulic pressure.

According to a third aspect of the invention, in the control apparatus according to the second aspect of the invention, the clutch control portion is configured to set the surge hydraulic-pressure command value higher and/or to set a time of output of the surge hydraulic-pressure command value longer, in a case in which a duration time of the output of the packing hydraulic-pressure command value is shorter than in another case, than in the another case.

According to a fourth aspect of the invention, in the control apparatus according to the first aspect of the invention, the engine-start control portion is configured to set, based on delay of response of the hydraulic pressure, a delay time from initiation of the output of the cranking hydraulic-pressure command value until initiation of output of the cranking torque by the electric motor, wherein engine-start control portion is configured to set the delay time longer in a case in which the cranking hydraulic-pressure command value is outputted before the elapse of the predetermined time than in a case in which the cranking hydraulic-pressure command value is outputted after the elapse of the predetermined time.

According to a fifth aspect of the invention, in the control apparatus according to the fourth aspect of the invention, the engine-start control portion is configured, in the case in which the cranking hydraulic-pressure command value is outputted before the elapse of the predetermined time, to set the delay time longer in a case in which a duration time of the output of the packing hydraulic-pressure command value is shorter than in another case, than in the another case.

According to a sixth aspect of the invention, in the control apparatus according to the first aspect of the invention, the clutch control portion is configured, in a case in which the cranking hydraulic-pressure command value is outputted before the elapse of the predetermined time, to output a surge hydraulic-pressure command value which is higher than the cranking hydraulic-pressure command value and which is dependent on a duration time of the output of the packing hydraulic-pressure command value, such that the surge hydraulic-pressure command value is outputted to the hydraulic control unit temporarily upon initiation of output of the cranking hydraulic-pressure command value, for increasing responsiveness of the hydraulic pressure, wherein the engine-start control portion is configured to set, based on delay of response of the hydraulic pressure, a delay time from the initiation of the output of the cranking hydraulic-pressure command value until initiation of output of the cranking torque by the electric motor, such that the delay time is set to a value that is dependent on a duration time of the output of the packing hydraulic-pressure command value in a case in which the cranking hydraulic-pressure command value is outputted before the elapse of the predetermined time, wherein the value of the delay time set by the engine-start control portion is smaller in a first case in which the surge hydraulic-pressure command value is higher in level than in a second case, than in the second case, as long as a time of output of the surge hydraulic-pressure command value is the same in the first and second cases, and wherein the value of the delay time set by the engine-start control portion is smaller in a third case in which the time of the output of the surge hydraulic-pressure command value is longer than in a fourth case, than in the fourth case, as long as the surge hydraulic-pressure command value is the same in level in the third and fourth cases.

According to a seventh aspect of the invention, in the control apparatus according to any one of the first through sixth aspects of the invention, the predetermined time is divided into a plurality of packing periods, and an output-initiation time point is determined in each one of the plurality of packing periods, for a case in which the cranking hydraulic-pressure command value is to be outputted before the elapse of the predetermined time, wherein, in the case of outputting the cranking hydraulic-pressure command value before the elapse of the predetermined time, the clutch control portion is configured to initiate outputting the cranking hydraulic-pressure command value at the output-initiation time point that is determined in one of the plurality of packing periods that includes a time point at which it is determined that the cranking is required.

According to an eighth aspect of the invention, in the control apparatus according to any one of the first through seventh aspects of the invention, the clutch control portion is configured, when placing the clutch in the pack-clearance-elimination completion state, to output a quick-filling hydraulic-pressure command value that is higher than the packing hydraulic-pressure command value, such that the quick-filling hydraulic-pressure command value is outputted to the hydraulic control unit, prior to the output of the packing hydraulic-pressure command value, for regulating the hydraulic pressure so as to increase responsiveness of the hydraulic pressure, wherein the clutch control portion is configured, in a case in which it is determined that the cranking is required during output of the quick-filling hydraulic-pressure command value, to output the cranking hydraulic-pressure command value without outputting the packing hydraulic-pressure command value, such that the output of the quick-filling hydraulic-pressure command value is followed by output of the cranking hydraulic-pressure command value.

According to a ninth aspect of the invention, in the control apparatus according to any one of the first through eighth aspects of the invention, there is further provided a cranking determination portion configured to determine whether the cranking is required depending on whether the request requesting the increase of the power performance of the vehicle has been made or not, wherein the request requesting the increase of the power performance of the vehicle includes an operation executed by a driver of the vehicle for increasing a drive request amount requested to the vehicle, and/or an operation executed by the driver of the vehicle for selecting a predetermined running mode that prioritizes the power performance rather than a fuel economy performance.

According to a tenth aspect of the invention, in the control apparatus according to the ninth aspect of the invention, the vehicle further includes a transmission disposed between the electric motor and the drive wheels in the power transmission path, wherein the cranking determination portion is configured to select one of the request requesting the increase of the power performance of the vehicle and a request requesting the cranking to be delayed, such that the selected one has higher priority than the other, wherein the cranking determination portion is configured to determine whether the request requesting the increase of the power performance of the vehicle has been made or not, depending on whether the request requesting the increase of the power performance of the vehicle has been selected as the selected one, and wherein the request requesting the cranking to be delayed includes a request to avoid shifting of the transmission and the switching of the operation state of the clutch from being executed in an overlapping manner.

According to an eleventh aspect of the invention, in the control apparatus according to the tenth aspect of the invention, there is further provided a sensor configured to detect a signal value that is to be used for controlling start of the engine, wherein the cranking determination portion is configured, in event of failure of the sensor, to determine that the cranking is required, irrespective of presence or absence of the request requesting the increase of the power performance of the vehicle and the request requesting the cranking to be delayed.

In the control apparatus according to the first aspect of the invention, in the case in which it is determined that the cranking is required by the request requesting the increase of the power performance of the vehicle during output of the packing hydraulic-pressure command value, the cranking hydraulic-pressure command value is outputted the in place of the packing hydraulic-pressure command value even before the elapse of the predetermined time that is required to place the clutch into the pack-clearance-elimination completion state. Thus, as compared with an arrangement in which the cranking hydraulic-pressure command value is not outputted until the elapse of the predetermined time, the cranking is done in an earlier stage. Therefore, when the engine is started, it is possible to reduce a time required to obtain a desired output of the vehicle.

In the control apparatus according to the second aspect of the invention, in the case in which the cranking hydraulic-pressure command value is outputted before the elapse of the predetermined time, the surge hydraulic-pressure command value, which is higher than the cranking hydraulic-pressure command value, is outputted to the hydraulic control unit temporarily upon initiation of output of the cranking hydraulic-pressure command value, for increasing responsiveness of the hydraulic pressure. Therefore, in the case in which the cranking hydraulic-pressure command value is outputted before the elapse of the predetermined time, the clutch can be quickly placed into the pack-clearance-elimination completion state.

In the control apparatus according to the third aspect of the invention, the surge hydraulic-pressure command values set higher and/or the time of output of the surge hydraulic-pressure command values set longer, in the case in which the duration time of the output of the packing hydraulic-pressure command value is shorter than in the another case, than in the another case. Therefore, the clutch can be quickly placed into the pack-clearance-elimination completion state, irrespective of length of the duration time of the output of the packing hydraulic-pressure command value.

In the control apparatus according to the fourth aspect of the invention, the delay time from the initiation of the output of the cranking hydraulic-pressure command value until the initiation of the output of the cranking torque by the electric motor, is set based on the delay of the response of the hydraulic pressure. Therefore, the cranking torque can be raised substantially concurrently with rise of a torque capacity of the clutch, so that it is possible to suppress a shock that could occur by timing difference between the rises of the cranking torque and the torque capacity. Further, the delay time is set longer in the case in which the cranking hydraulic-pressure command value is outputted before the elapse of the predetermined time than in the case in which the cranking hydraulic-pressure command value is outputted after the elapse of the predetermined time. Therefore, even in the case in which the cranking hydraulic-pressure command value is outputted before the elapse of the predetermined time, the cranking torque can be raised substantially concurrently with the rise of the torque capacity of the clutch.

In the control apparatus according to the fifth aspect of the invention, in the case in which the cranking hydraulic-pressure command value is outputted before the elapse of the predetermined time, the delay time is set longer in the case in which the duration time of the output of the packing hydraulic-pressure command value is shorter than in the another case, than in the another case. Therefore, in the case in which the cranking hydraulic-pressure command value is outputted before the elapse of the predetermined time, the cranking torque can be raised substantially concurrently with the rise of the torque capacity of the clutch, irrespective of length of the duration time.

In the control apparatus according to the sixth aspect of the invention, in the case in which the cranking hydraulic-pressure command value is outputted before the elapse of the predetermined time, the surge hydraulic-pressure command value which is higher than the cranking hydraulic-pressure command value and which is dependent on the duration time of the output of the packing hydraulic-pressure command value, is outputted to the hydraulic control unit temporarily upon initiation of the output of the cranking hydraulic-pressure command value, for increasing responsiveness of the hydraulic pressure. Therefore, in the case in which the cranking hydraulic-pressure command value is outputted before the elapse of the predetermined time, the clutch can be quickly placed into the pack-clearance-elimination completion state, irrespective of length of the duration time of the output of the packing hydraulic-pressure command value. Further, the delay time from the initiation of the output of the cranking hydraulic-pressure command value until the initiation of the output of the cranking torque by the electric motor is set based on the delay of the response of the hydraulic pressure, such that the delay time is set to the value that is dependent on the duration time of the output of the packing hydraulic-pressure command value in the case in which the cranking hydraulic-pressure command value is outputted before the elapse of the predetermined time. Therefore, in the case in which the cranking hydraulic-pressure command value is outputted before the elapse of the predetermined time, the cranking torque can be raised substantially concurrently with rise of a torque capacity of the clutch, irrespective of length of the duration time of the output of the packing hydraulic-pressure command value, so that it is possible to suppress a shock that could occur by timing difference between the rises of the cranking torque and the torque capacity. Further, the value of the delay time set by the engine-start control portion is smaller in the first case in which the surge hydraulic-pressure command value is higher in level than in the second case, than in the second case, as long as the time of output of the surge hydraulic-pressure command value is the same in the first and second cases, and is smaller in the third case in which the time of the output of the surge hydraulic-pressure command value is longer than in the fourth case, than in the fourth case, as long as the surge hydraulic-pressure command value is the same in level in the third and fourth cases. Therefore, the surge hydraulic-pressure command value and the delay time can be set appropriately depending on the above-described duration time.

In the control apparatus according to the seventh aspect of the invention, the predetermined time is divided into the plurality of packing periods, and the output-initiation time point is determined in each one of the plurality of packing periods, for the case in which the cranking hydraulic-pressure command value is to be outputted before the elapse of the predetermined time, and, in the case of outputting the cranking hydraulic-pressure command value before the elapse of the predetermined time, the output of the cranking hydraulic-pressure command value is initiated at the output-initiation time point that is determined in one of the plurality of packing periods that includes the time point at which it is determined that the cranking is required. Therefore, the control can be simplified as compared with an arrangement in which the output of the cranking hydraulic-pressure command value is initiated at the time point at which it is determined that the cranking is required.

In the control apparatus according to the eighth aspect of the invention, in the case in which it is determined that the cranking is required during the output of the quick-filling hydraulic-pressure command value, the cranking hydraulic-pressure command value is outputted without outputting the packing hydraulic-pressure command value, such that the output of the quick-filling hydraulic-pressure command value is followed by the output of the cranking hydraulic-pressure command value. Therefore, the control can be simplified, and the cranking of the engine can be made earlier.

In the control apparatus according to the ninth aspect of the invention, the request requesting the increase of the power performance of the vehicle includes the operation executed by the driver of the vehicle for increasing the drive request amount requested to the vehicle, and/or the operation executed by the driver of the vehicle for selecting the predetermined running mode that prioritizes the power performance rather than the fuel economy performance. Therefore, when it is determined that the cranking is required by the operation for increasing the drive request amount or the operation for selecting the predetermined running mode that prioritizes the power performance, during the output of the packing hydraulic-pressure command value, the cranking hydraulic-pressure command value is outputted in place of the packing hydraulic-pressure command value.

In the control apparatus according to the tenth aspect of the invention, the request requesting the cranking to be delayed includes the request to avoid shifting of the transmission and the switching of the operation state of the clutch from being executed in the overlapping manner, and one the request requesting the increase of the power performance of the vehicle and the request requesting the cranking to be delayed, is selected in accordance with a predetermined mediation method, such that the selected one has higher priority than the other. Further, it is determined whether the request requesting the increase of the power performance of the vehicle has been made or not, depending on whether the request requesting the increase of the power performance of the vehicle has been selected or not. Therefore, the determination as to whether the cranking is required or not can be appropriately made.

In the control apparatus according to the eleventh aspect of the invention, in event of failure of the sensor configured to detect the signal value that is to be used for controlling the start of the engine, it is determined that the cranking is required, irrespective of presence or absence of the request requesting the increase of the power performance of the vehicle and the request requesting the cranking to be delayed. Therefore, in even of the failure of the sensor, the cranking of the engine is quickly made whereby the start of the engine is complemented, without the normal engine-start control operation in which the cranking hydraulic-pressure command value is outputted after the packing hydraulic-pressure command value has been outputted for the predetermine time.

DETAILED DESCRIPTION OF PREFERRED EMBODIMENT

Hereinafter, there will be described preferred embodiment in detail with reference to the accompanying drawings.

Embodiment

Figure 1:
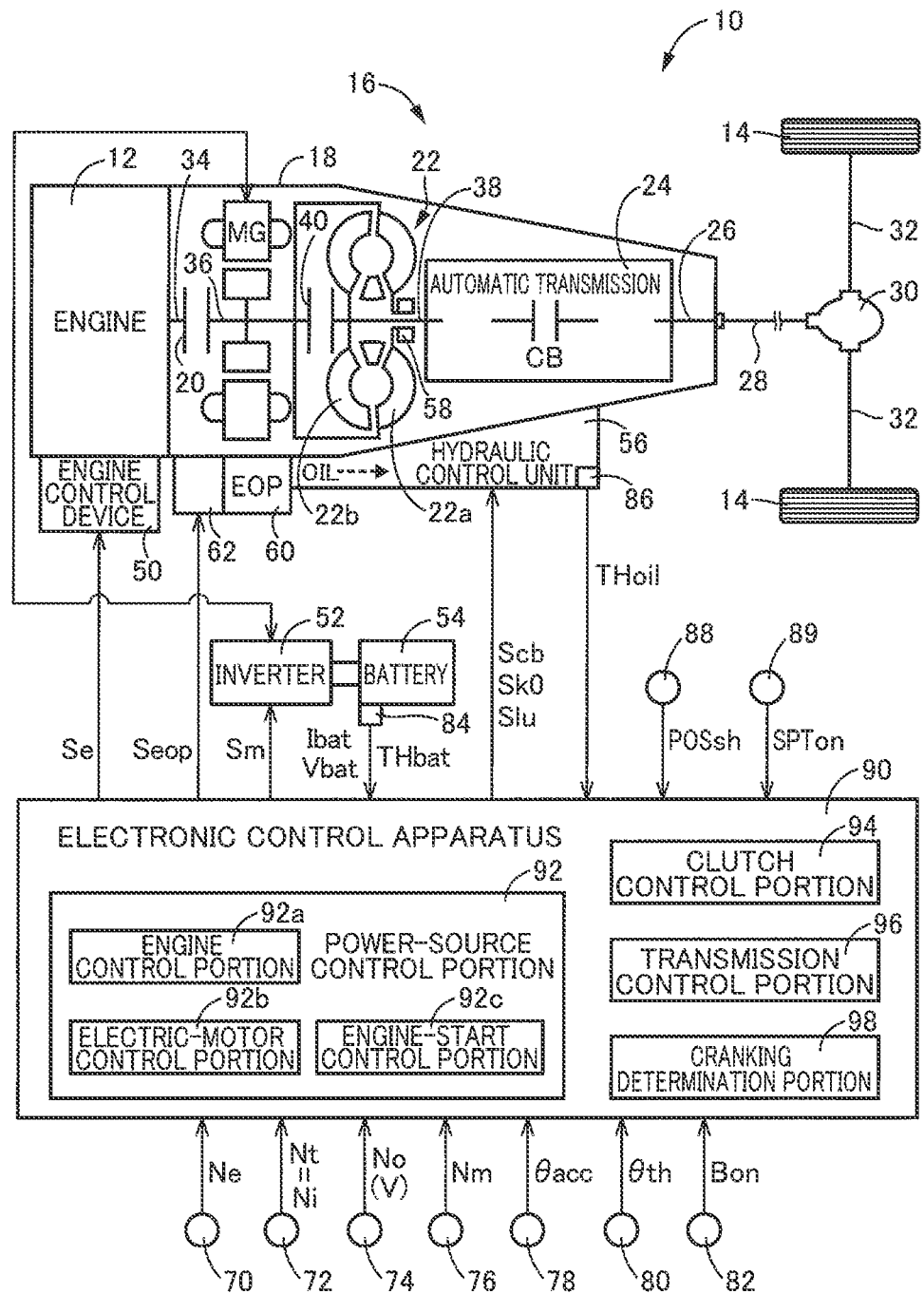
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid electric vehicle including an engine 12 and an electric MG that serve as power source SP for driving the vehicle 10. The vehicle 10 further includes drive wheels 14 and a power transmission apparatus 16 that is provided in a power transmission path between the engine 12 and the drive wheels 14.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The electric motor MG is a rotating electric machine having a function serving as a motor configured to generate a mechanical power from an electric power and a function serving as a generator configured to generate an electric power from a mechanical power. That is, the electric motor MG is a so-called "motor generator". The electric motor MG is connected to a battery 54 provided in the vehicle 10, through an inverter 52 provided in the vehicle 10. The battery 54 is an electric storage device to and from which the electric power is supplied from and to the electric motor MG. The inverter 52 is controlled by the electronic control apparatus 90 whereby an MG torque Tm as an output torque of the electric motor MG is controlled. The MG torque Tm serves as a power driving torque when acting as a positive torque for acceleration, with the electric motor MG being rotated in a forward direction that is the same as a direction of rotation of the engine 12 during operation of the engine 12. The MG torque Tm serves as a regenerative torque when acting as a negative torque for deceleration, with the electric motor MG being rotated in the forward direction. Specifically, the electric motor MG receives the electric power from the battery 54 through the inverter 52, and generates the power for driving the vehicle 10, in place of or in addition to the engine 12. Further, the electric motor MG generates the electric power based on the power of the engine 12 or a driven power transmitted from the drive wheels 14. The electric power generated by the electric motor MG is supplied to the battery 54 through the inverter 52 so as to be stored in the battery 54. The electric power corresponds to an electric energy unless they are to be distinguished from each other. The power corresponds to a force or a torque unless they are to be distinguished from each other.

The power transmission apparatus 16 includes a casing 18 as a non-rotary member that is attached to a body of the vehicle 10, a K0 clutch 20 provided between the engine 12 and the electric motor MG in the power transmission path between the engine 12 and the drive wheels 14, a torque converter 22 connected to the engine 12 through the K0 clutch 20 and an automatic transmission 24 connected to the torque converter 22. The K0 clutch 20, electric motor MG, torque converter 22 and automatic transmission 24 are disposed inside the casing 18. The torque converter 22 and the automatic transmission 24 constitute respective parts of the power transmission path between the engine 12 and the drive wheels 14. The automatic transmission 24 is disposed in a power transmission path between the torque converter 22 and the drive wheels 14. The automatic transmission 24 is a transmission disposed between the electric motor MG and the drive wheels 14 in the power transmission path between the enginel 2 and the drive wheels 14. The power transmission apparatus 16 further includes a propeller shaft 28 connected to a transmission output shaft 26 that is an output rotary member of the automatic transmission 24, a differential gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20, and an electric-motor connection shaft 36 connecting between the K0 clutch 20 and the torque converter 22.

The electric motor MG is connected to the electric-motor connection shaft 36 in a power transmittable manner in the casing 18. That is, the electric motor MG is disposed in the power transmission path between the engine 12 and the drive wheels 14, so as to be connected to the engine 12 and the drive wheels 14 in a power transmittable manner, more specifically, the electric motor MG is disposed in a power transmission path between the K0 clutch 20 and the torque converter 22, so as to be connected to the K0 clutch 20 and the torque converter 22 in a power transmittable manner. From another point of view, the electric motor MG is connected to the torque converter 22 and the automatic transmission 24 without through the K0 clutch 20 in a power transmittable manner.

The torque converter 22 includes a pump impeller 22a connected to the electric-motor connection shaft 36, and a turbine impeller 22b connected to a transmission input shaft 38 that is an input rotary member of the automatic transmission 24. The torque converter 22 is a fluid-type transmission device, and is configured to transmit the drive powers of the power sources SP, from the electric-motor connection shaft 36 to the transmission input shaft 38, through fluid circulating in the torque converter 22. The torque converter 22 includes an LU clutch 40 configured to connect between the pump impeller 22a and the turbine impeller 22b. The LU clutch 40 is a known lockup clutch serving as a direct connection clutch configured to connect between the electric-motor connection shaft 36 and the transmission input shaft 38.

The LU clutch 40 is configured to receive an LU hydraulic pressure PRlu that is a regulated hydraulic pressure supplied from a hydraulic control unit (hydraulic control circuit) 56 provided in the vehicle 10, whereby an LU torque Tlu, i.e., torque capacity of the LU clutch 40 is changed and its control or operation state is switched. As the operation state of the LU clutch 40, there are a released state in which the LU clutch 40 is fully released, a slipped state in which the LU clutch 40 is engaged with slipping, and a engaged state in which the LU clutch 40 is fully engaged. When the LU clutch 40 is placed in the released state, the torque converter 22 is placed in a torque converter state in which a torque boosting effect is obtained. When the LU clutch 40 is placed in the fully engaged state, the torque converter 22 is placed in a lockup state in which the pump impeller 22a and the turbine impeller 22b are rotated integrally with each other.

The automatic transmission 24 is a known automatic transmission of a planetary gear type which includes at least one planetary gear device and a plurality of engagement devices CB. Each of the engagement devices CB is a hydraulically-operated frictional engagement device. Each of the engagement devices CB is configured to receive a CB hydraulic pressure PRcb that is a regulated hydraulic pressure supplied from the hydraulic control unit 56, whereby a CB torque Tcb, i.e., torque capacity of the engagement device CB is changed and its control or operation state is switched between an engaged state and a released state, for example.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) γat (=AT input rotational speed Ni/AT output rotational speed No). The automatic transmission 24 is configured to switch from one of the AT gear positions to another one of the AT gear positions, namely, to establish one of the AT gear positions which is selected, by the electronic control apparatus 90, depending on, for example, an accelerating operation made by a vehicle driver (operator) and the vehicle running speed V. The AT input rotational speed Ni is a rotational speed of the transmission input shaft 38, and is an input rotational speed of the automatic transmission 24. The AT input rotational speed Ni is also a rotational speed of the output rotary member of the torque converter 22, and is equal to a turbine rotational speed Nt that is an output rotational speed of the torque converter 22. Therefore, the AT input rotational speed Ni can be represented by the turbine rotational speed Nt. The AT output rotational speed No is a rotational speed of the transmission output shaft 26, and is an output rotational speed of the automatic transmission 24.

The K0 clutch 20 is a wet-type or dry-type frictional engagement device constituted by a multiple-disc type or single-disc type clutch that is to be pressed by, for example, a hydraulic clutch actuator 120 that is described below. With the clutch actuator 120 being controlled by the electronic control apparatus 90, a control or operation state of the K0 clutch 20 is switched between an engaged state and a released state, for example. It is noted that the K0 clutch 20 corresponds to "clutch" recited in the appended claims.

Figure 2:
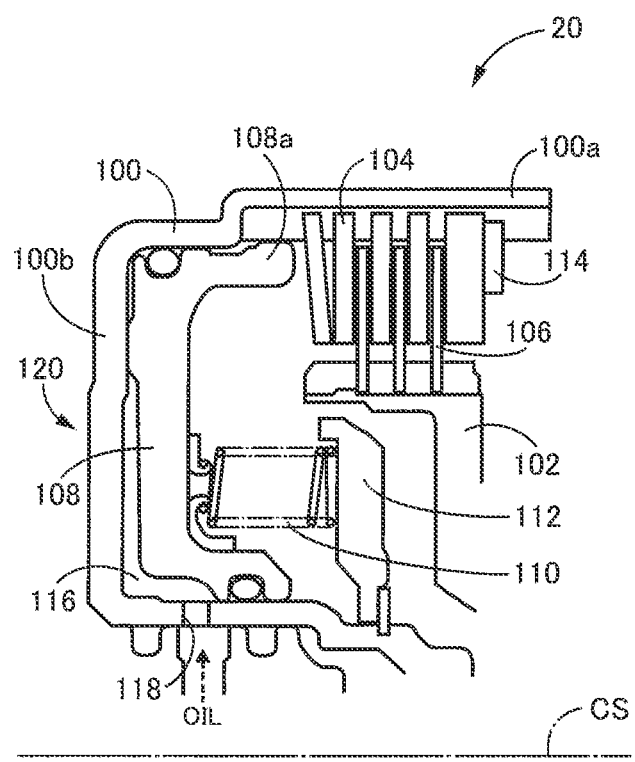
FIG. 2 is a partial cross-sectional view showing, by way of example, a K0 clutch.

FIG. 2 is a partial cross-sectional view showing, by way of example, the K0 clutch 20. As shown in FIG. 2, the K0 clutch 20 includes a clutch drum 100, a clutch hub 102, a plurality of separate plates 104, a plurality of friction plates 106, a piston 108, a return spring 110, a spring receiver plate 112 and a snap ring 114. The clutch drum 100 and the clutch hub 102 are both disposed on an axis CS that is aligned with axes of respective shafts such as the engine connection shaft 34 and the electric-motor connection shaft 36. It is noted that FIG. 2 shows a part of an outer peripheral portion of the K0 clutch 20 wherein the part is located on an upper side of the axis CS. The clutch drum 100 is connected to the engine connection shaft 34 so as to be rotated integrally with the engine connection shaft 34. The clutch hub 102 is connected to the electric-motor connection shaft 36 so as to be rotated integrally with the electric-motor connection shaft 36. Each of the separate plates 104 has a generally annular shape, and is splined or fitted at its outer peripheral end portion to an inner circumferential surface of a cylindrical portion 100a of the clutch drum 100, such that the separate plates 104 are not rotatable relative to the clutch drum 100. Each of the friction plates 106, which also has a generally annular shape, is interposed between corresponding adjacent two of the separate plates 104 and is splined or fitted at its inner peripheral end portion to an outer circumferential surface of the clutch hub 102, such that the friction plates 106 are not rotatable relative to the clutch hub 102. The piston 108 includes a pressing portion 108a extending from its outer peripheral end portion toward the separate plates 104 and the friction plates 106. The return spring 110 is interposed between the piston 108 and the spring receiver plate 112 that is fixed to the clutch drum 100 so as to constantly force the piston 108 toward a bottom plate portion 100b of the clutch drum 100 such that a part of the piston 108 can be brought into contact with the bottom plate portion 100b of the clutch drum 100. That is, the return spring 110 serves as a spring element biasing or constantly forcing the piston 108 in a direction that causes the separate plates 104 to be disengaged from the friction plates 106. The snap ring 114 is fixed in the inner circumferential surface of the cylindrical portion 100a of the clutch drum 100 so as to be located in a position that makes the snap ring 114 cooperate with the pressing portion 108a of the piston 108 to sandwich the separate plates 104 and the friction plates 106. The K0 clutch 20 has a fluid chamber 116 defined between the piston 108 and the bottom plate portion 100b of the clutch drum 100. The clutch drum 100 has a fluid passage 118 that is in communication with the fluid chamber 116. In the K0 clutch 20, the above-described clutch drum 100, piston 108, return spring 110, spring receiver plate 112 and fluid chamber 116 cooperate with one another to constitute a clutch actuator 120 as a hydraulic actuator.

The hydraulic control unit 56 is configured to supply a K0 hydraulic pressure PRk0 that is a regulated hydraulic pressure, to the clutch actuator 120. In the K0 clutch 20, when the K0 hydraulic pressure PRk0 (used for switching an operation state of the K0 torque Tk0) is supplied from the hydraulic control unit 56 to the fluid chamber 116 through the fluid passage 118, the piston 108 is moved, by the supplied K0 hydraulic pressure PRk0, toward the separate plates 104 and the friction plates 106, against a biasing force of the return spring 110, whereby the separate plates 104 and the friction plates 106 are pressed by the pressing portion 108a of the piston 108, so that the K0 clutch 20 is placed into its engaged state. A K0 torque Tk0, which is a torque capacity of the K0 clutch 20, is changed with change of the operation state of the K0 clutch 20 that is changed depending on the K0 hydraulic pressure PRk0.

The K0 torque Tk0 is dependent on, for example, the K0 hydraulic pressure PRk0 and a friction coefficient of a friction member of each of the friction plates 106. In the K0 clutch 20, when the fluid chamber 116 is filled with a working fluid OIL, a clearance between each of the separate plates 104 and a corresponding one of the friction plates 106 is eliminated by a pressing force (=PRk0×piston pressure-receiving area) of the piston 108 that acts against the biasing force of the return spring 110, namely, a pack clearance of the K0 clutch 20 is eliminated. In the following description regarding the present embodiment, a state in which the pack clearance of the K0 clutch 20 is eliminated will be referred to as "pack-clearance-elimination completion state". In the K0 clutch 20, the K0 torque Tk0 is generated with the K0 hydraulic pressure PRk0 being further increased from the pack-clearance-elimination completion state. That is, in the K0 clutch 20, the pack-clearance-elimination completion state is a state in which the K0 clutch 20 starts to have the torque capacity, namely, the K0 torque Tk0 starts to be generated, if the K0 hydraulic pressure PRk0 is increased from the pack-clearance-elimination completion state. The K0 hydraulic pressure PRk0 required for eliminating the pack clearance of the K0 clutch 20 is the K0 hydraulic pressure PRk0 required for establishing a state in which the piston 108 reaches its stroke end and the K0 torque Tk0 is not generated yet. It is noted that each of the separate plates 104 corresponds to "first member" recited in the appended claims and that each of the friction plates 106 corresponds to "second member" recited in the appended claims.

Referring back to FIG. 1, when the K0 clutch 20 is engaged, the engine 12 and the torque converter 22 are connected to each other in a power transmittable manner. On the other hand, when the K0 clutch 20 is released, transmission of the power between the engine 12 and the torque converter 22 is interrupted. Since the electric motor MG is connected to the torque converter 22, the K0 clutch 20 serves as a clutch configured to cut off the power transmission path between the engine 12 and the electric motor MG, namely, to disconnect the engine 12 from the electric motor MG.

In the power transmission apparatus 16, the power outputted from the engine 12 is transmitted, when the K0 clutch 20 is engaged, to the drive wheels 14 from the engine connection shaft 34 through sequentially the K0 clutch 20, electric-motor connection shaft 36, torque converter 22, automatic transmission 24, propeller shaft 28, differential gear device 30 and drive shafts 32, for example. Further, the power transmitted from the electric motor MG is transmitted, irrespective of the operation state of the K0 clutch 20, to the drive wheels 14 from the electric-motor connection shaft 36 through sequentially the torque converter 22, automatic transmission 24, propeller shaft 28, differential gear device 30 and drive shafts 32, for example.

The vehicle 10 further includes an MOP 58 that is a mechanically-operated oil pump, an EOP 60 that is an electrically-operated oil pump, and a pump motor 62. The MOP 58 is connected to the pump impeller 22a, and is to be rotated and driven by the power source or sources SP (i.e., engine 12 and/or electric motor MG), so as to output a working fluid OIL that is to be used in the power transmission apparatus 16. The pump motor 62 is a motor serving exclusively to rotate and drive the EOP 60. The EOP 60 outputs the working fluid OIL, when being rotated and driven by the pump motor 62. The working fluid OIL outputted by the MOP 58 and the EOP 60 is supplied to the hydraulic control unit 56. The hydraulic control unit 56, which receives the working fluid OIL as an original hydraulic pressure, supplies regulated hydraulic pressures that serve as the LU hydraulic pressure PRlu, the CB hydraulic pressure PRcb and the K0 hydraulic pressure PRk0, for example.

The vehicle 10 is provided with the electronic control apparatus 90 that includes a control apparatus for the vehicle 10. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation and a hydraulic-pressure control operation, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of a MG speed sensor 76 indicative of the motor rotational speed Nm; an output signal of an accelerator-opening degree sensor 78 indicative of an accelerator opening degree (accelerator operation degree) θacc representing an amount of accelerating operation made by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current Ibat and a battery voltage Vbat; an output signal of a fluid temperature sensor 86 indicative of a working-fluid temperature THoil that is a temperature of the working fluid OIL in the hydraulic control unit 56; an output signal of a shift position sensor 88 indicative of a shift operation position POSsh that is an operation position of a shift lever provided in the vehicle 10; and an output signal of a sport-mode selection switch 89 which is a sport-mode ON signal SPTon indicating that a sport mode MRspt is selected by the vehicle driver.

The sport-mode selection switch 89 is provided in vicinity of a driver seat of the vehicle 8. The sport-mode selection switch 89 is a switch that is to be placed in its ON state by the vehicle driver when the sport mode MRspt is to be selected as a running mode MR of the vehicle 10. The sport mode MRspt is an example of a certain running mode MRf which is a predetermined running mode MR for improving a running performance of the vehicle 10 and which prioritizes responsiveness of the drive torque Tr to an operation made by the vehicle driver. The certain running mode MRf is the running mode MR in which more importance is given to a power performance rather than to a fuel economy performance. When the certain running mode MRf such as the sport mode MRspt is not selected or established, a normal mode MRnml in which the fuel economy performance and the power performance are balanced with each other, is established.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the electric motor MG; a CB hydraulic control command signal Scb that is to be supplied to the hydraulic control unit 56 for controlling the operation states of the engagement devices CB; a K0 hydraulic control command signal Sko that is to be supplied to the hydraulic control unit 56 for controlling the K0 clutch 20; an LU hydraulic control command signal SLU that is to be supplied to the hydraulic control unit 56 for controlling the operation state of the LU clutch 40; and an EOP control command signal Seop that is to be supplied to the pump motor 62 for controlling the EOP 60.

The CB hydraulic command signal Scb represents a CB hydraulic command value Spcb that is a hydraulic-pressure command value by which the regulated CB hydraulic pressure PRcb is to be supplied from the hydraulic control unit 56. The K0 hydraulic command signal Sk0 represents a K0 hydraulic command value Spk0 that is a hydraulic-pressure command value by which the regulated K0 hydraulic pressure PRk0 is to be supplied from the hydraulic control unit 56. The LU hydraulic command signal Slu represents an LU hydraulic command value Splu that is a hydraulic-pressure command value by which the regulated LU hydraulic pressure PRlu is to be supplied from the hydraulic control unit 56.

For performing various control operations in the vehicle 10, the electronic control apparatus 90 includes a power-source control means in the form of a power-source control portion 92, a clutch control means in the form of a clutch control portion 94, and a transmission control means in the form of a transmission control portion 96.

The power-source control portion 92 has a function serving as an engine control means in the form of an engine control portion 92a for controlling operation of the engine 12 and a function serving as an electric-motor control means in the form of an electric-motor control portion 92b for controlling operation of the electric motor MG through the inverter 52, and serves as a hybrid control means in the form of a hybrid control portion for executing a hybrid-drive control operation, for example, using the engine 12 and the electric motor MG through these control functions.

The power-source control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels 14. From another point of view, the requested drive torque Trdem [Nm] is a requested drive power Proem [W] at the current vehicle running speed V. As the requested drive amount, another value such as a requested drive force Frdem [N] of the drive wheels 14 and a requested AT output torque of the transmission output shaft 26 may be used, too. In the calculation of the requested drive amount, it is also possible to use, for example, the AT output rotational speed No in place of the vehicle running speed V. The power-source control portion 92 outputs the engine control command signal Se and the MG control command signal Sm for controlling the engine 12 and the electric motor MG, respectively, such that the requested drive power Prdem is realized, by taking account of various factors such as a transmission loss, an auxiliary load, the gear ratio γat of the automatic transmission 24 and the maximum chargeable amount Win and maximum dischargeable amount Wout of the battery 54.

When the requested drive torque Trdem can be covered by only the output of the electric motor MG, the power-source control portion 92 establishes a BEV driving mode as a driving mode. When the BEV driving mode is established, the power-source control portion 92 causes the vehicle 10 to perform a motor driving (=BEV driving) using only the electric motor MG serving as the power source SP. On the other hand, when the requested drive torque Trdem cannot be covered without at least the output of the engine 12, the power-source control portion 92 establishes another driving mode that is an engine driving mode, i.e., an HEV driving mode. When the HEV driving mode is established, the power-source control portion 92 causes the vehicle 10 to perform an engine driving, i.e., a hybrid driving (=HEV driving) with the K0 clutch 20 being engaged and with at least the engine 12 serving as the power source SP. Further, even when the requested drive torque Trdem can be covered by only the output of the electric motor MG, the power-source control portion 92 establishes the HEV driving mode, for example, in a case in which the battery 54 needs to charged or in a case in which the engine 12 or other component needs to be warmed up.

The power-source control portion 92 further has a function serving as an engine-start control means in the form of an engine-start control portion 92c. The engine-start control portion 92c determines whether the starting of the engine 12 is requested or not, namely, whether an operation state of the engine 12 requires to be switched from a stopped state to an operated state. This determination is made, for example, depending on (i) whether the requested drive torque Trdem has been made larger than a range that can be covered by only the output of the electric motor MG in the BEV driving mode, (ii) whether the engine 12 or other component needs to be warmed up in the BEV driving mode, or (iii) the state-of-charge value SOC of the battery 54 is less than the engine-start threshold value in the BEV driving mode.

The clutch control portion 94 controls the K0 clutch 20 for executing the engine-start control operation for starting the engine 12. For example, when it is determined by the engine-start control portion 92c that the starting of the engine 12 is requested, the clutch control portion 94 outputs a K0 hydraulic-pressure control command signal Sk0 that is supplied to the hydraulic control unit 56, wherein the K0 hydraulic-pressure control command signal Sk0 requests switching of the K0 clutch 20 from the released state to the engaged state for obtaining the K0 torque Tk0 by which a cranking torque Tcr is transmitted toward the engine 12, and wherein the cranking torque Tcr is a torque required to increase the engine rotational speed Ne and to crank the engine 12.

The engine-start control portion 92c controls the engine 12 and the electric motor MG to execute the engine-start control operation for starting the engine 12. For example, when determining that the starting of the engine 12 is requested, the engine-start control portion 92c is configured, upon switching of the K0 clutch 20 to the engaged state, to supply, to the inverter 52, the MG control command signal Sm requesting the electric motor MG to output the cranking torque Tcr. That is, when the engine 12 is to be started, the engine-start control portion 92c supplies, to the inverter 52, the MG control command signal Sm by which the electric motor MG is controlled to output the cranking torque Tcr, namely, by which the MG torque Tm is increased by an amount corresponding to the cranking torque Tcr. Further, when determining that the starting of the engine 12 is requested, the engine-start control portion 92c is configured, in conjunction of the cranking of the engine 12 by cooperation of the K0 clutch 20 and the electric motor MG, to supply, to the engine control device 50, the engine control command signal Se by which a fuel supply and an engine ignition are started. That is, for starting the engine 12, the engine-start control portion 92c supplies, to the engine control device 50, the engine control command signal Se for controlling the engine 12 so as to start the engine 12.

When the engine 12 is cranked, a reaction force is generated, namely, a reaction torque is generated as a result of engagement of the K0 clutch 20. This reaction force causes drop of a drive torque Tr, due to inertia during the starting of the engine 12 in the BEV driving. Therefore, when the engine 12 is to be started, the MG torque Tm is increased by the cranking torque Tcr which cancels the reaction force, namely, which corresponds to a reaction compensation torque compensating the reaction force. The cranking torque Tcr, which is the K0 torque Tk0 required for cranking the engine 12, is to be transmitted from the electric motor MG to the engine 12 through the K0 clutch 20. The cranking torque Tcr is, for example, a certain cranking torque that is predetermined based on, for example, specifications of the engine 12 and a method of starting the engine 12.

The power-source control portion 92 whether the stop of the engine 12 is requested, namely, whether the operation state of the engine 12 requires to be switched from the stopped state to the operated state. In this determination, an affirmative determination is made, for example, when (i) the requested drive torque Trdem is not larger than the range that can be covered by only the output of the electric motor MG, (ii) the engine 12 or other component do not need to be warmed up, and (iii) the battery 54 does not need to be charged.

When determining that stop of the engine 12 is requested, the power-source control portion 92 supplies, to the engine control device 50, the engine control command signal Se requesting gradual reduction of the engine torque Te. Thereafter, after the K0 clutch 20 is switched to the released state by the clutch control portion 94, the power-source control portion 92 supplies, to the engine control device 50, the engine control command signal Se requesting fuel cut for stopping the fuel supply to the engine 12.

The transmission control portion 96 determines whether a shifting action is to be executed in the automatic transmission 24, by using, for example, a shifting map that represents a predetermined relationship, and outputs the CB hydraulic control command signal Scb, as needed, which is supplied to the hydraulic control unit 56, for executing the shifting action in the automatic transmission 24. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 24. In the shifting map, one of the two variables may be the AT output rotational speed No in place of the vehicle running speed V, and the other of the two variables may be any one of the requested drive force Frdem, accelerator opening degree θacc and throttle opening degree θth in place of the requested drive torque Trdem.

Figure 3:
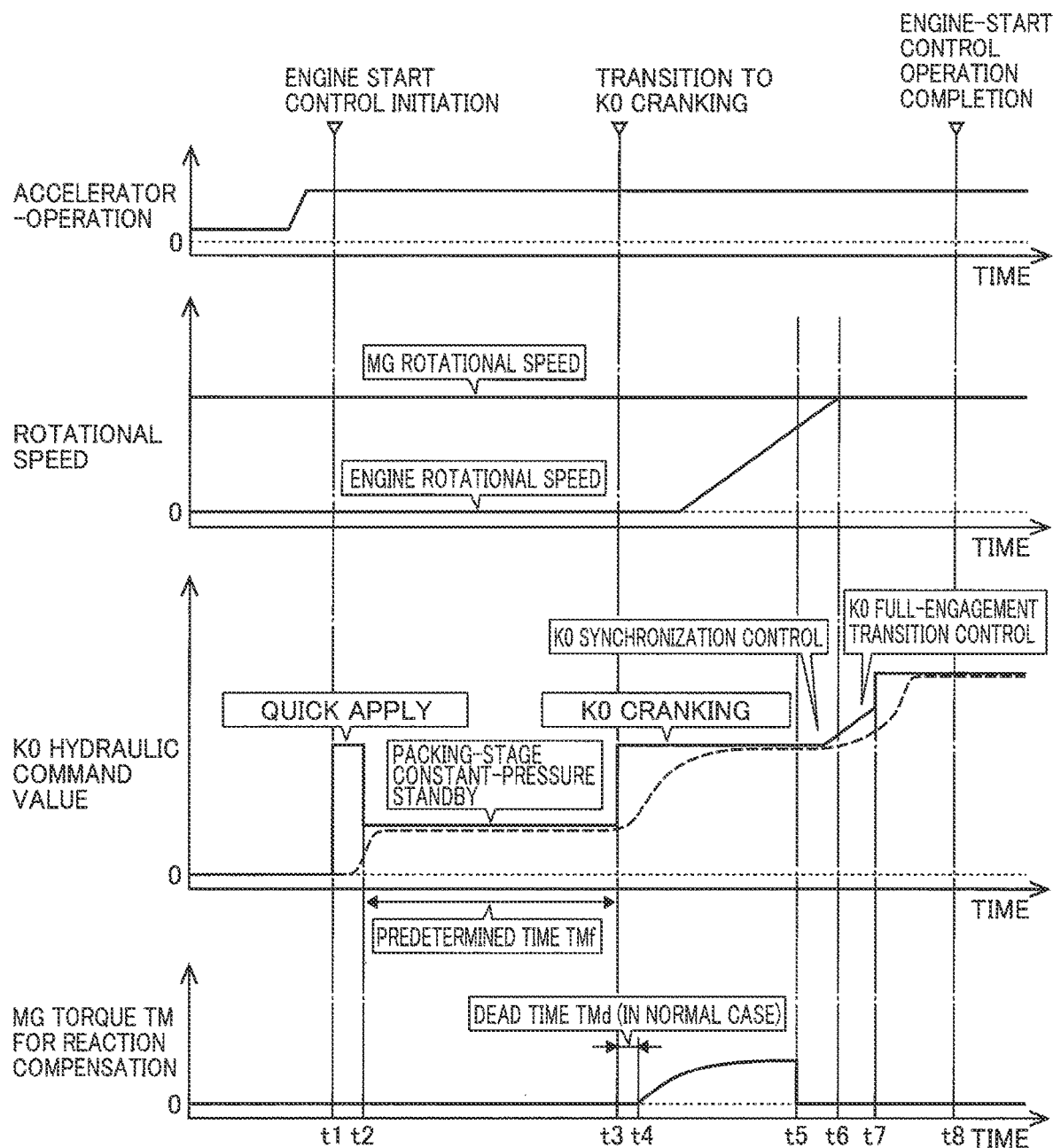
FIG. 3 is a view showing, by way of example, a time chart in a case in which an engine-start control operation is executed to start an engine of the vehicle.

FIG. 3 is a view showing, by way of example, a time chart in a case in which the engine-start control operation is executed to start the engine 12. In FIG. 3, a time point t1 indicates a point time at which the engine-start control operation is initiated as a result of determination that the starting of the engine 12 is requested by depression of an accelerator pedal by the vehicle driver, for example, during the BEV driving. After initiation of the engine-start control operation for starting the engine 12, a packing control operation for eliminating the pack clearance of the K0 clutch 20 is executed (see time point t1 to time point t3). In the packing control operation for eliminating the pack clearance of the K0 clutch 20, firstly, a quick apply is executed to temporarily output the high K0 hydraulic command value Spk0 for increasing an initial responsiveness of the K0 hydraulic pressure PRk0 (see time point t1 to time point t2). In the following description regarding the present embodiment, the K0 hydraulic command value Spk0 in the quick apply will be referred to as "quick-filling hydraulic-pressure command value Spk0$qa$". This quick-filling hydraulic-pressure command value Spk0$qa$ is the K0 hydraulic command value Spk0 for regulating the K0 hydraulic pressure PRk0 so as to increase the responsiveness of the K0 hydraulic pressure PRk0 in the packing control operation for eliminating the pack clearance of the K0 clutch 20. In the packing control operation for eliminating the pack clearance of the K0 clutch 20, the quick apply is followed by a packing-stage constant-pressure standby that is executed to standby at a constant pressure for completing packing of the K0 clutch 20 (see time point t2 to time point t3). This constant pressure is, for example, a constant packing pressure PRk0$pk$ that is the K0 hydraulic pressure PRk0 for keeping the K0 clutch 20 in the pack-clearance-elimination completion state. In the following description regarding the present embodiment, the K0 hydraulic command value Spk0 in the packing-stage constant-pressure standby will be referred to as "packing hydraulic-pressure command value Spk0*pk*". This packing hydraulic-pressure command value Spk0*pk* is the K0 hydraulic command value Spk0 for regulating the K0 hydraulic pressure PRk0 so as to place the K0 clutch 20 into the pack-clearance-elimination completion state when the K0 clutch 20 is to be switched from the released state to the engaged state. After a predetermined time TMf has elapsed from initiation of output of the packing hydraulic-pressure command value Spk0*pk*, the cranking, i.e., K0 cranking is executed by the K0 clutch 20 for transmitting the cranking torque Tcr toward the engine 12 so as to crank the engine 12 (see time point t3 to time point t5). The predetermined time TMf is, for example, a packing time as a predetermined length of time that is required to place the K0 clutch 20 into the pack-clearance-elimination completion state. In the following description regarding the present embodiment, the K0 hydraulic command value Spk0 in the K0 cranking will be referred to as "cranking hydraulic-pressure command value Spk0*cr*". This cranking hydraulic-pressure command value Spk0*cr* is the K0 hydraulic command value Spk0 for realizing the K0 hydraulic pressure PRk0 that is obtained by adding the K0 hydraulic pressure PRk0 corresponding to the cranking torque Tcr, to the packing pressure PRk0*pk*, and for regulating the K0 hydraulic pressure PRk0 so as to enable the K0 clutch 20 to transmit the cranking torque Tcr. In the K0 cranking, the electric motor MG is controlled to output the MG torque Tm whose magnitude corresponds to the cranking torque Tcr, namely, the MG torque Tm for reaction compensation. This MG torque Tm for reaction compensation starts to be generated after a dead time TMd has elapsed, in view of delay of response of the K0 hydraulic pressure PRk0 in the K0 clutch 20, and then is gradually increased toward the cranking torque Tcr (see time point t4 to time point t5). The dead time TMd is a delay time that is a predetermined length of time determined depending on delay of response of the K0 hydraulic pressure PRk0 from initiation of output of the cranking hydraulic-pressure command value Spk0*cr* until initiation of output of the cranking torque Tcr by the electric motor MG. In the K0 cranking, when the engine rotational speed Ne is increased, the engine ignition is initiated whereby an initial combustion of the engine 12 is caused. Thereafter, when self-rotation of the engine 12 is stabilized by explosion of the engine 12 after the initial combustion, namely, when the engine 12 is in complete explosion, a rotational-synchronization control operation for the engine 12 and the electric motor MG, i.e., a K0 synchronization control operation for quickly synchronizing the input and output rotational speeds of the K0 clutch 20, is executed (see time point t5 to time point t6). The K0 synchronization control operation is followed by a K0 full-engagement transition control operation that is executed for placing the K0 clutch 20 into the fully engaged state (see time point t6 to time point t7). After the K0 clutch 20 has been placed into the fully engaged state by the K0 full-engagement transition control operation, the fully engaged state of the K0 clutch 20 is maintained (see time point t7 and thereafter). A time point t8 indicates a point time at which the engine-start control operation for starting the engine 12 is completed.

As shown in FIG. 3, when the engine 12 is to be started, the clutch control portion 94 outputs the packing hydraulic-pressure command value Spk0*pk* to the hydraulic control unit 56 in process of switching of the operation state of the K0 clutch 20 from the released state to the engaged state. Further, after elapse of the predetermined time TMf from initiation of output of the packing hydraulic-pressure command value Spk0*pk*, the clutch control portion 94 outputs the cranking hydraulic-pressure command value Spk0*cr*, which is higher than the packing hydraulic-pressure command value Spk0*pk*, to the hydraulic control unit 56. Further, when placing the K0 clutch 20 into the pack-clearance-elimination completion state, the clutch control portion 94 outputs the quick-filling hydraulic-pressure command value Spk0*qa*, which is higher than the packing hydraulic-pressure command value Spk0*pk*, to the hydraulic control unit 56, prior to output of the packing hydraulic-pressure command value Spk0*pk*. Further, the engine-start control portion 92*c* sets the dead time TMd, when causing the electric motor MG to output the MG torque Tm for reaction compensation corresponding to the cranking torque Tc.

By the way, in a case in which a request requesting an increase of the power performance of the vehicle 10 is made during the engine-start control operation for starting the engine 12, if the cranking hydraulic-pressure command value Spk0*cr* is not outputted until the predetermined time TMf elapses, as in a case in which such a request is not made, it could take time to obtain a desired output of the vehicle 10. The desired output of the vehicle 10 corresponds to a drive request amount such as the requested drive torque Trdem, requested drive power Prdem and requested drive force Frdem.

Therefore, in a case in which it is determined that the cranking of the engine 12 is required by the request requesting the increase of the power performance of the vehicle 10 during output of the packing hydraulic-pressure command value Spk0*pk*, the clutch control portion 94 outputs the cranking hydraulic-pressure command value Spk0*cr* in place of the packing hydraulic-pressure command value Spk0*pk* even before the elapse of the predetermined time TMf.

Specifically, the electronic control apparatus 90 includes a cranking determination means in the form of a cranking determination portion 98, for realizing a control function of reducing a time required to obtain a desired output of the vehicle 10.

The cranking determination portion 98 determines whether or not the packing control operation (quick apply, packing-stage constant-pressure standby) is being executed by the clutch control portion 94 for eliminating the pack clearance of the K0 clutch 20. When determining that the packing control operation is being executed, the cranking determination portion 98 determines whether the cranking of the vehicle 12 is required or not, depending on whether the request requesting the increase of the power performance of the vehicle 10 is made or not. That is, the cranking determination portion 98 determines whether or not there is a K0 cranking transition determination, namely, whether a transition to the K0 cranking by the clutch control portion 94 is required or not. The request requesting the increase of the power performance of the vehicle 10 is also a request requesting the transition to the K0 cranking.

The request requesting the increase of the power performance of the vehicle 10 includes an operation for increasing the drive request amount such as the requested drive torque Trdem, and/or an operation for selecting a certain running mode MRf or a predetermined running mode MR that prioritizes the power performance rather than the fuel economy performance. The operation for increasing the drive request amount is, for example, the vehicle driver's operation for stepping or depressing the accelerator pedal or the vehicle driver's operation for increasing acceleration in setting switches for a known cruise control. The operation for selecting the certain running mode MRf is, for example, the vehicle driver's operation for selecting the sport mode MRspt, i.e., placing the sport-mode selection switch 89 into its ON state. The certain running mode MRf may include, in addition to the sport mode MRspt, an off-road mode MRofr, a towing mode MRtow and a manual mode MRmnl, for example. The off-road mode MRofr is the predetermined running mode MR for improving a runnability in an off-road environment or the like, and is to be selected, for example, with operation of an off-road-mode selection switch (not shown) by the vehicle driver. The towing mode MRtow is the predetermined running mode MR suitable for running while towing a towed vehicle, and is to be selected, for example, with operation of a towing-mode selection switch (not shown) by the vehicle driver. The manual mode MRmnl is the predetermined running mode MR that enables the automatic transmission 24 to be manually shifted by a shifting operation made by the vehicle driver, and is to be selected, for example, by the shifting operation. The shifting operation, by which the manual mode MRmnl is selected, is, for example, an operation by which the shift lever is placed in a manual shift operation position as the shift operation position POSsh, or an operation made on a known paddle switch provided in the steering wheel.

On the other hand, when the engine-start control operation for starting the engine 12 and the shifting operation for shifting the automatic transmission 24 are executed in an overlapping manner, there is a risk of a shock that could be generated, for example, if the synchronization of the K0 clutch 20 is made during an inertia phase period in process of the shifting operation. In the shifting operation for shifting the automatic transmission 24, there is a case in which the flow rate of the working fluid OIL in the hydraulic control unit 56 is considerably high. In such a case, there is a risk that the K0 clutch 20 could not be appropriately controlled due to insufficiency of the flow rate of the working fluid OIL. In view of these risks, the transmission control portion 96 outputs a request to delay the cranking of the engine 12, i.e., delay the transition to the K0 cranking, for example, during execution of the shifting operation for shifting the automatic transmission 24. That is, the request to delay the cranking of the engine 12 includes a request to avoid the shifting of the transmission 24 and the switching of the clutch 20 from the released state to the engaged state, from being executed in an overlapping manner.

Therefore, the cranking determination portion 98 selects one of the request to increase the power performance of the vehicle 10 and the request to delay the cranking of the engine 12, in accordance with a predetermined mediation method, such that the selected one has higher priority than the other. Specifically described, a certain degree of priority is preset for the request for transition to the K0 cranking, wherein the request is made by the vehicle driver's operation for stepping or depressing the accelerator pedal or for selecting the certain running mode MRf. Further, a certain degree of priority is preset for the request to delay the transition to the K0 cranking, wherein the request is made by the shifting operation for shifting the automatic transmission 24. For example, in a case in which the accelerator opening degree θacc is relatively large, higher priority is set for the request to increase the power performance of the vehicle 10, than for the request to delay the transition to the K0 cranking, because it is considered that the increase of the acceleration responsiveness rather than the shock suppression should be prioritized in such a case. Further, in a case in which the accelerator opening degree θacc is relatively small, a lower priority is set for the request to increase the power performance of the vehicle 10, than for the request to delay the transition to the K0 cranking, because it is considered that the shock suppression rather than the increase of the acceleration responsiveness should be prioritized in such a case. Thus, when a plurality of requests are made, one of the requests having higher priority is selected. Then, the cranking determination portion 98 determines whether the request to increasing the power performance of the vehicle 10 has been made or not, depending on whether selecting the request to increase the power performance of the vehicle 10 or not.

On the other hand, in event of a failure affecting the engine-start control operation during execution of the engine-start control operation for starting the engine 12, it is desirable to quickly complete the starting of the engine 12. For example, during execution of the packing control operation for eliminating the pack clearance of the K0 clutch 20, in event of the failure affecting the engine-start control operation for starting the engine 12, it is desirable to quickly transit to the K0 cranking with higher priority than the request to increase the power performance of the vehicle 10 and the request to delay the cranking of the engine 12. The failure affecting the engine-start control operation for starting the engine 12 is, for example, a failure of a sensor configured to detect a signal value used in the engine-start control operation for starting the engine 12, wherein such a sensor is the engine speed sensor 70 or the MG speed sensor 76, for example. In event of the failure of the sensor configured to detect the signal value used in the engine-start control operation for starting the engine 12, the cranking determination portion 98 determines that there is the K0 cranking transition determination, namely, determines that the cranking of the engine 12 is required, with higher priority than the request to increase the power performance of the vehicle 10 and the request to delay the cranking of the engine 12.

During execution of the packing control operation for eliminating the pack clearance of the K0 clutch 20, when it is determined by the cranking determination portion 98 that there is the K0 cranking transition determination, the clutch control portion 94 outputs the cranking hydraulic-pressure command value Spk0cr.

Specifically, when it is determined by the cranking determination portion 98 that the K0 cranking transition determination is present during output of the packing hydraulic-pressure command value Spk0pk, the clutch control portion 94 outputs the cranking hydraulic-pressure command value Spk0cr in place of the packing hydraulic-pressure command value Spk0pk even before the elapse of the predetermined time TMf.

In a case in which the cranking hydraulic-pressure command value Spk0cr is outputted before the elapse of the predetermined time TMf, there is a possibility that the K0 clutch 20 is not yet in the pack-clearance-elimination completion state. Therefore, in order to quickly eliminate the pack clearance of the K0 clutch 20, the cranking hydraulic-pressure command value Spk0cr is set to the high K0 hydraulic command value Spk0 temporarily upon initiation of the output of the cranking hydraulic-pressure command value Spk0cr. That is, in a case in which the cranking hydraulic-pressure command value Spk0cr is outputted before the elapse of the predetermined time TMf, the clutch control portion 94 outputs a surge hydraulic-pressure command value Spk0sg that is higher than the cranking hydraulic-pressure command value Spk0cr, such that the surge hydraulic-pressure command value Spk0sg is outputted to the hydraulic control unit 56 temporarily upon initiation of output of the cranking hydraulic-pressure command value Spk0cr, for increasing responsiveness of the hydraulic pressure. The shorter a constant-pressure standby duration time TMcw that is a duration time of the output of the packing hydraulic-pressure command value Spk0*pk*, the more likely that the elimination of the pack clearance of the K0 clutch 20 has not been completed. The clutch control portion 94 sets a surge height HTsg (which is a level of the surge hydraulic-pressure command value Spk0*sg*) larger and/or sets a surge time TMsg (which is a time of output of the surge hydraulic-pressure command value Spk0*sg*) longer, when the constant-pressure standby duration time TMcw has been short, than when the constant-pressure standby duration time TMcw has been long.

From another view point, after initiation of output of the cranking hydraulic-pressure command value Spk0*cr*, rise of the K0 torque Tk0 is delayed in a case in which the elimination of the pack clearance of the K0 clutch 20 has not yet been completed, as compared with in a case in which the elimination of the pack clearance of the K0 clutch 20 has been completed. Therefore, in order to initiate generation of the MG torque Tm for reaction compensation, at the rise of the K0 torque Tk0, in a case in which it is determined by the cranking determination portion 98 that the K0 cranking transition determination is present, a correction is made to the dead time TMd (see FIG. 3) of a normal case in which the cranking hydraulic-pressure command value Spk0*cr* is generated in absence of the K0 cranking transition determination. In the engine-start control operation for starting the engine 12 in the normal case, the cranking hydraulic-pressure command value Spk0*cr* is outputted after the packing hydraulic-pressure command value Spk0*pk* has been outputted for the predetermined time TMf. The engine-start control portion 92*c* sets the dead time TMd longer in the case in which the cranking hydraulic-pressure command value Spk0*cr* is outputted before elapse of the predetermined time TMf, than in the case in which the cranking hydraulic-pressure command value Spk0*cr* is outputted after elapse of the predetermined time TMf. The dead time TMd in the case in which the cranking hydraulic-pressure command value Spk0*cr* is outputted before elapse of the predetermined time TMf, is referred to as "high-response-case dead time TMdB". In the case in which the cranking hydraulic-pressure command value Spk0*cr* is outputted before elapse of the predetermined time TMf, the engine-start control portion 92*c* sets the high-response-case dead time TMdB higher when the constant-pressure standby duration time TMcw is short, than when the constant-pressure standby duration time TMcw is long.

From still another view point, the surge hydraulic-pressure command value Spk0*sg* and the high-response-case dead time TMdB are interrelated to each other. For example, when the surge hydraulic-pressure command value Spk0*sg* is equally set irrespective of the constant-pressure standby duration time TMcw, or when surge hydraulic-pressure command value Spk0*sg* is not set irrespective of the constant-pressure standby duration time TMcw, the high-response-case dead time TMdB is set longer as the constant-pressure standby duration time TMcw is shorter. On the other hand, where the elimination of the pack clearance of the K0 clutch 20 is completed quickly with the surge hydraulic-pressure command value Spk0*sg* being set depending on the constant-pressure standby duration time TMcw, the high-response-case dead time TMdB may be short or zero irrespective of the constant-pressure standby duration time TMcw. That is, the clutch control portion 94 may set the surge hydraulic-pressure command value Spk0*sg* to value dependent on the constant-pressure standby duration time TMcw. Further, in the case in which the cranking hydraulic-pressure command value Spk0*cr* is outputted before elapse of the predetermined time TMf, the engine-start control portion 92*c* may set the high-response-case dead time TMdB to a value dependent on the constant-pressure standby duration time TMcw, such that the value of the delay time TMd set by the engine-start control portion 92*c* is smaller in a first case in which the surge height HTsg is higher (namely, the surge hydraulic-pressure command value Spk0*sg* is higher in level) than in a second case, than in the second case, as long as the surge time TMsg is the same in the first and second cases, and such that the value of the delay time TMd set by the engine-start control portion 92*c* is smaller in a third case in which the surge time TMsg is longer (namely, the time of the output of the surge hydraulic-pressure command valueSpk0*sg* is longer) than in a fourth case, than in the fourth case, as long as surge height HTsg is the same (namely, the surge hydraulic-pressure command value Spk0*sg* is the same in level) in the third and fourth cases.

There will be described a timing at which output of the cranking hydraulic-pressure command value Spk0*cr* replaces output of the packing hydraulic-pressure command value Spk0*pk*. The predetermined time TMf is predivided into a plurality of packing periods PDpk, and an output-initiation time point is determined in each one of the plurality of packing periods PDpk, for a case in which the cranking hydraulic-pressure command value Spk0*cr* is to be outputted before the elapse of the predetermined time TMf. For example, the output-initiation time point (at which the cranking hydraulic-pressure command value Spk0*cr* is initiated to be outputted) is set to an end point of each one of the packing periods PDpk. That is, the cranking hydraulic-pressure command value Spk0*cr* is initiated to be outputted at the end point of one of the packing periods PDpk that includes a time point at which it is determined that the K0 cranking transition determination is present. In the case of outputting the cranking hydraulic-pressure command value Spk0*cr* before the elapse of the predetermined time TMf, the clutch control portion 94 is configured to initiate outputting the cranking hydraulic-pressure command value Spk0*cr* at the output-initiation time point that is determined in one of the packing periods PDpk that includes the time point at which it is determined that the K0 cranking transition determination is present. The time point at which the K0 cranking transition determination is present, corresponds to the constant-pressure standby duration time TMcw. The clutch control portion 94 makes the transit to the K0 cranking at a timing that is dependent on the constant-pressure standby duration time TMcw. Thus, in the present embodiment, the output-initiation time point of the cranking hydraulic-pressure command value Spk0*cr* is not the time point at which it is determined that the K0 cranking transition determination is present, but one of the above-described output-initiation time points of the respective packing periods PDpk, wherein the output-initiation time points are spaced at a constant time interval. Thus, the output-initiation time point of the cranking hydraulic-pressure command value Spk0*cr* is selected from among a limited number of time points, so that the control can be simplified.

In the packing control operation for eliminating the pack clearance of the K0 clutch 20, there is a case in which the K0 cranking transition determination is present during the quick apply rather than during the packing-stage constant-pressure standby. In this case, after completion of the quick apply, the K0 hydraulic command value Spk0 does not have to be reduced to the packing hydraulic-pressure command value Spk0*pk*, and it is preferable to immediately transit to the K0 cranking. In the case in which it is determined by the cranking determination portion 98 that the K0 cranking transition determination is present during output of the quick-filling hydraulic-pressure command value Spk0*qa*, the clutch control portion 94 outputs the cranking hydraulic-pressure command value Spk0*cr* without outputting the packing hydraulic-pressure command value Spk0*pk*, such that the output of the quick-filling hydraulic-pressure command value Spk0*qa* is followed by output of the cranking hydraulic-pressure command value Spk0*cr*. A quick apply period PDqa, which is a period of the quick apply, is not a period into which the predetermined time TMf is divided, but may be interpreted to correspond to a kind of one of the packing periods PDpk. Further, the quick apply period PDqa may be interpreted to correspond to one of the packing periods PDpk in which the constant-pressure standby duration time TMcw is zero. Therefore, also during the quick apply, the clutch control portion 94 makes the transit to the K0 cranking at a timing that is dependent on the constant-pressure standby duration time TMcw.

Figure 4:
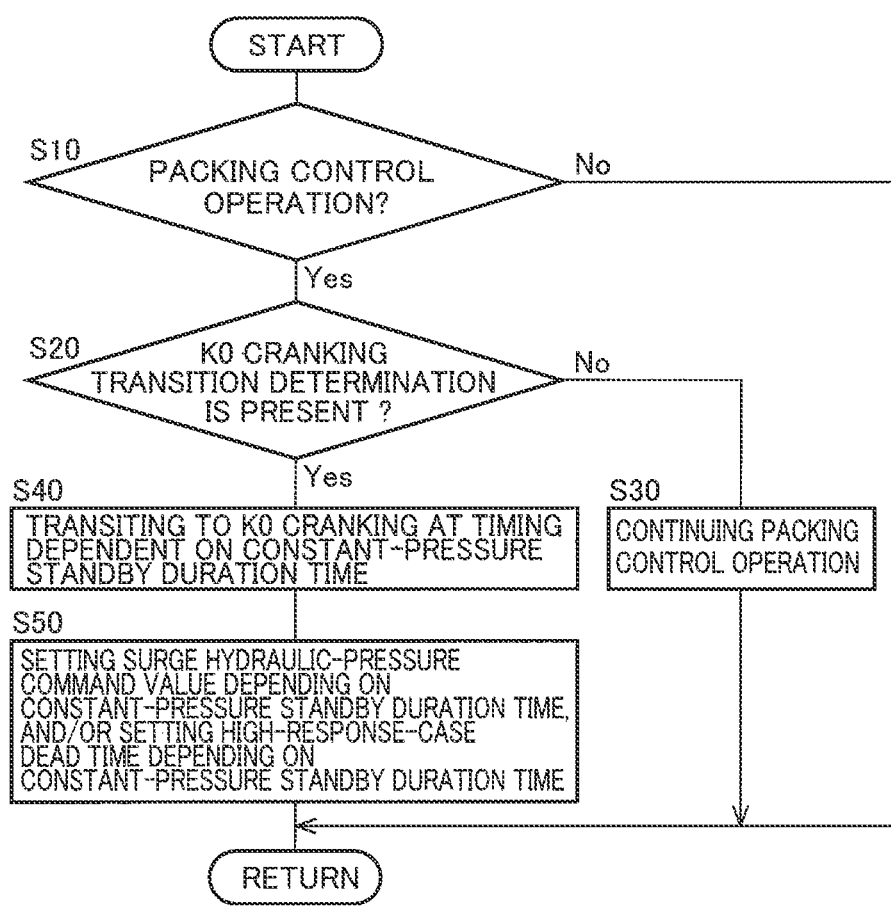
FIG. 4 is a flow chart showing a main part of a control routine executed by an electronic control apparatus, namely, a control routine that is executed to reduce a time required to obtain a desired output of the vehicle when the engine is started.
Figure 5:
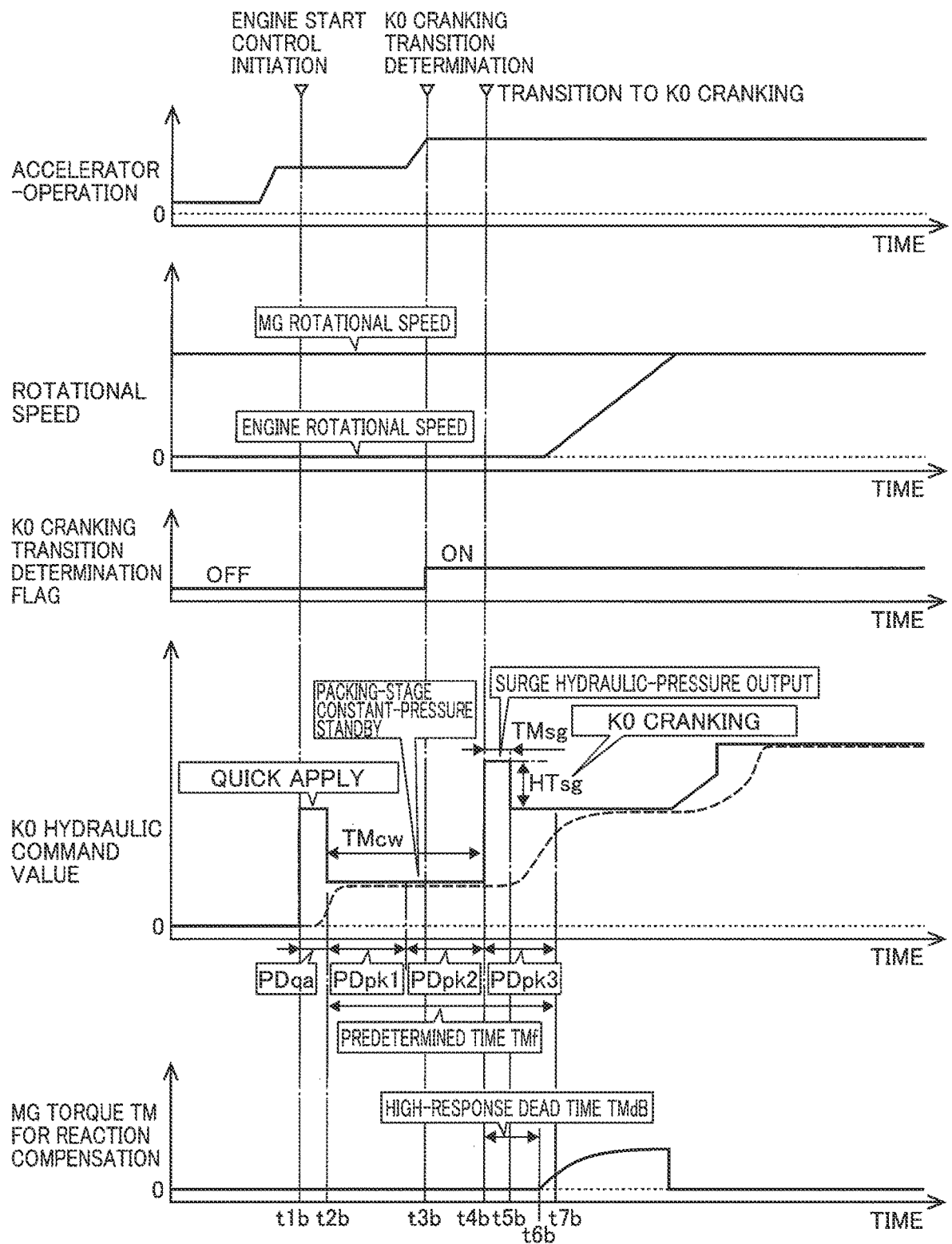
FIG. 5 is a view showing, by way of example, a time chart in a case in which the control routine shown in the flow chart of FIG. 4 is executed.

FIG. 4 is a flow chart showing a main part of a control routine executed by the electronic control apparatus 90, namely, a control routine that is executed to reduce the time required to obtain a desired output of the vehicle 10 when the engine 12 is to be started. This control routine is executed, for example in a repeated manner. FIG. 5 is a view showing, by way of example, a time chart in a case in which the control routine shown in the flow chart of FIG. 4 is executed.

As shown in FIG. 4, the control routine is initiated with step S10 corresponding to function of the cranking determination portion 98, which is implemented to determine whether the packing control operation for eliminating the pack clearance of the K0 clutch 20, is being executed or not. When a negative determination is made at step S10, one cycle of execution of the control routine is terminated. When an affirmative determination is made at step S10, step S20 corresponding to function of the cranking determination portion 98 is implemented to determine whether the K0 cranking transition determination is present or not. When a negative determination is made at step S20, the control flow goes to step S30 corresponding to function of the clutch control portion 94, which is implemented to continue the packing control operation for eliminating the pack clearance of the K0. When an affirmative determination is made at step S20, step S40 corresponding to function of the clutch control portion 94, which is implemented to transit to the K0 cranking at a timing dependent on the constant-pressure standby duration time TMcw. Step S40 is followed by step S50 corresponding to functions of the engine-start control portion 92*c* and the clutch control portion 94, which is implemented to set the surge hydraulic-pressure command value Spk0*sg* depending on the constant-pressure standby duration time TMcw, and/or to set the high-response-case dead time TMdB depending on the constant-pressure standby duration time TMcw. When the surge hydraulic-pressure command value Spk0*sg* is set, the high-response-case dead time TMdB is set with the surge time TMsg and the surge height HTsg being taken into account.

FIG. 5 shows, by way of example, a case in which the request to improve the power performance of the vehicle 10 is made after initiation of the engine-start control operation for starting the engine 12, for example, during BEV driving. In FIG. 5, a time point t1*b* indicates a point time at which the engine-start control operation is initiated as a result of determination that the starting of the engine 12 is requested by depression of an accelerator pedal by the vehicle driver, for example, during the BEV driving. After initiation of the engine-start control operation for starting the engine 12, the quick apply is executed in the quick apply period PDqa (see time point t1*b* to time point tb2). Then, following the quick apply, the packing-stage constant-pressure standby is initiated (see time point tb2). During the packing-stage constant-pressure standby, when it is determined that the K0 cranking transition determination is made by the vehicle driver's operation for stepping or depressing the accelerator pedal, a K0 cranking transition determination flag is set in ON state (see time point t3*b*). In the present embodiment, the predetermined time TMf is predivided into a first packing period PDpk1, a second packing period PDpk2 and a third packing period PDpk3, for example (see time point t2*b* to time point t7*b*). Since the time point at which it is determined that the K0 cranking transition determination is present is included in the second packing period PDpk2, the output-initiation time point of the cranking hydraulic-pressure command value Spk0*cr* is set at the end point of the second packing period PDpk2 (see time point t4*b*). Thus, after the packing-stage constant-pressure standby is continued until the end point of the second packing period PDpk2, the K0 cranking is initiated. Upon initiation of output of the cranking hydraulic-pressure command value Spk0*cr*, the surge hydraulic-pressure command value Spk0*sg* dependent on the constant-pressure standby duration time TMcw is outputted (see time point t4*b* to time point t5*b*). Further, when the MG torque Tm for reaction compensation is to be outputted from the electric motor MG, the high-response-case dead time TMdB dependent on the constant-pressure standby duration time TMcw is set (see time point t4*b* to time point t6*b*). The high-response-case dead time TMdB is set, for example, with the surge time TMsg and the surge height HTsg of the surge hydraulic-pressure command value Spk0*sg* being taken into account.

In a case in which the time point at which it is determined that the K0 cranking transition determination is present is included in the third packing period PDpk3, the output-initiation time point of the cranking hydraulic-pressure command value Spk0*cr* is set at the end point of the third packing periods PDpk3. In the present embodiment, the end point of the third packing period PDpk3 corresponds to an end point of the predetermined time TMf, so that the output-initiation time point of the cranking hydraulic-pressure command value Spk0*cr* is the same as in the engine-start control operation in the normal case. In this case, the surge hydraulic-pressure command value Spk0*sg* does not have to be set upon initiation of output of the cranking hydraulic-pressure command value Spk0*cr*. In this case in which the surge hydraulic-pressure command value Spk0*sg* is not set, the high-response-case dead time TMdB is set to the same value as the dead time TMd in the engine-start control operation in the normal case. Alternatively, the surge hydraulic-pressure command value Spk0*sg* may be set, in order to reduce the time required to obtain the desired output of the vehicle 10. Where the surge hydraulic-pressure command value Spk0*sg* is set, the high-response-case dead time TMdB is set to be shorter than the dead time TMd in the engine-start control operation in the normal case, so that it is possible to reduce the time required to obtain the desired output of the vehicle 10, as compared with in the engine-start control operation in the normal case.

As described above, in the present embodiment, in the case in which it is determined that the cranking of the engine 12 is required by the request requesting the increase of the power performance of the vehicle 10 during output of the packing hydraulic-pressure command value Spk0*pk*, the cranking hydraulic-pressure command value Spk0cr is outputted the in place of the packing hydraulic-pressure command value Spk0pk even before the elapse of the predetermined time TMf that is required to place the K0 clutch 20 into the pack-clearance-elimination completion state. Thus, as compared with an arrangement in which the cranking hydraulic-pressure command value Spk0cr is not outputted until the elapse of the predetermined time TMf, the cranking of the engine 12 is done in an earlier stage. Therefore, when the engine 12 is to be started, it is possible to reduce a time required to obtain the desired output of the vehicle 10.

In the present embodiment, in the case in which the cranking hydraulic-pressure command value Spk0cr is outputted before the elapse of the predetermined time TMf, the surge hydraulic-pressure command value Spk0sg, which is higher than the cranking hydraulic-pressure command value Spk0cr, is outputted to the hydraulic control unit 56 temporarily upon initiation of output of the cranking hydraulic-pressure command value Spk0cr, for increasing the responsiveness of the K0 hydraulic pressure PRk0. Therefore, in the case in which the cranking hydraulic-pressure command value Spk0cr is outputted before the elapse of the predetermined time TMf, the K0 clutch 20 can be quickly placed into the pack-clearance-elimination completion state.

In the present embodiment, the surge height HTsg is set larger and/or the surge time TMsg is set longer, in the case in which the constant-pressure standby duration time TMcw is shorter than in the another case, than in the another case. Therefore, the K0 clutch 20 can be quickly placed into the pack-clearance-elimination completion state, irrespective of length of the constant-pressure standby duration time TMcw.

In the present embodiment, when the MG torque Tm for reaction compensation is to be outputted from the electric motor MG, the dead time TMd is provided thereby enabling the cranking torque Tcr of the electric motor MG can be raised substantially concurrently with rise of the K0 torque Tk0, so that it is possible to suppress a shock that could occur by timing difference between the rises of the cranking torque Tcr and the K0 torque Tk0. Further, the dead time TMd is set longer in the case in which the cranking hydraulic-pressure command value Spk0cr is outputted before the elapse of the predetermined time TMf than in the case in which the cranking hydraulic-pressure command value Spk0cr is outputted after the elapse of the predetermined time TMf. Therefore, even in the case in which the cranking hydraulic-pressure command value Spk0cr is outputted before the elapse of the predetermined time TMf, the cranking torque Tcr can be raised substantially concurrently with the rise of the K0 torque Tk0.

In the present embodiment, in the case in which the cranking hydraulic-pressure command value Spk0cr is outputted before the elapse of the predetermined time TMf, the high-response-case dead time TMdB is set longer in the case in which the constant-pressure standby duration time TMcw is shorter than in the another case, than in the another case. Therefore, in the case in which the cranking hydraulic-pressure command value Spk0cr is outputted before the elapse of the predetermined time TMf, the cranking torque Tcr can be raised substantially concurrently with the rise of the K0 torque Tk0, irrespective of length of the constant-pressure standby duration time TMcw.

In the present embodiment, the value of the high-response-case dead time TMdB is made smaller in a first case in which the surge hydraulic-pressure command value Spk0sg is higher in level than in a second case, than in the second case, as long as the length of the surge time TMsg is the same in the first and second cases, and is made smaller in a third case in which the surge time TMsg is longer than in a fourth case, than in the fourth case, as long as the surge height HTsg is the same in level in the third and fourth cases. Therefore, the surge hydraulic-pressure command value Spk0sg and the high-response-case dead time TMdB can be set appropriately depending on the constant-pressure standby duration time TMcw.

In the present embodiment, the predetermined time TMf is divided into the plurality of packing periods PDpk, and the output-initiation time point of the cranking hydraulic-pressure command value Spk0cr is determined in each one of the plurality of packing periods PDpk, for the case in which the cranking hydraulic-pressure command value Spk0cr is to be outputted before the elapse of the predetermined time TMf, and, in the case of outputting the cranking hydraulic-pressure command value Spk0cr before the elapse of the predetermined time TMf, the output of the cranking hydraulic-pressure command value Spk0cr is initiated at the output-initiation time point of the cranking hydraulic-pressure command value Spk0cr that is determined in one of the plurality of packing periods PDpk that includes the time point at which it is determined that the K0 cranking transition determination is present. Therefore, the control can be simplified as compared with an arrangement in which the output of the cranking hydraulic-pressure command value Spk0cr is initiated at the time point at which it is determined that the K0 cranking transition determination is present.

In the present embodiment, in the case in which it is determined that the K0 cranking transition determination is present during the output of the quick-filling hydraulic-pressure command value Spk0qa, the cranking hydraulic-pressure command value Spk0cr is outputted without outputting the packing hydraulic-pressure command value Spk0pk, such that the output of the quick-filling hydraulic-pressure command value Spk0qa is followed by the output of the cranking hydraulic-pressure command value Spk0cr. Therefore, the control can be simplified, and the cranking of the engine 12 can be made earlier.

In the present embodiment, the request requesting the increase of the power performance of the vehicle 10 includes the operation for increasing the drive request amount such as the requested drive torque Trdem, and/or the operation for selecting the predetermined running mode MR that prioritizes the power performance rather than the fuel economy performance. Therefore, when it is determined that the K0 cranking transition determination is present by the operation for increasing the drive request amount or the operation for selecting the predetermined running mode MR that prioritizes the power performance, during the output of the packing hydraulic-pressure command value Spk0pk, the cranking hydraulic-pressure command value Spk0cr is outputted in place of the packing hydraulic-pressure command value Spk0pk.

In the present embodiment, one the request to increase of the power performance of the vehicle 10 and the request to delay the cranking of the engine 12 is selected in accordance with the predetermined mediation method, such that the selected one has higher priority than the other. Further, it is determined whether the request to increase of the power performance of the vehicle 10 has been made or not, depending on whether the request to increase of the power performance of the vehicle 10 has been selected or not. Therefore, the determination as to whether the K0 cranking transition determination is present or not can be appropriately made.

In the present embodiment, in event of failure of the sensor or sensors configured to detect the signal value or values that are to be used for the engine-start control operation for starting the engine 12, it is determined that the K0 cranking transition determination is present, irrespective of presence or absence of the request to increase the power performance of the vehicle 10 and the request to delay the cranking of the engine 12. Therefore, in even of the failure of the sensor or sensors, the cranking of the engine 12 is quickly made whereby the start of the engine 12 is complemented, without the normal engine-start control operation in which the cranking hydraulic-pressure command value Spk0cr is outputted after the packing hydraulic-pressure command value Spk0pk has been outputted for the predetermine time TMf.

While the preferred embodiment of this invention has been described in detail by reference to the drawings, it is to be understood that the invention may be otherwise embodied.

In the above-described embodiment, the automatic transmission 24 is an automatic transmission of a planetary gear type, by way of example. However, the automatic transmission 24 may be any one of other type transmissions such as a synchronous mesh twin shaft parallel axis-type automatic transmission including a known DCT (Dual Clutch Transmission). That is, the present invention is applicable to any vehicle provided with a power source including an engine and an electric motor, and a clutch provided between the engine and the electric motor.

In the above-described embodiment, the fluid transmission device in the form of the torque converter 22 is provided in the power transmission apparatus 16. However, the provision of the torque converter 22 is not essential. For example, the fluid transmission device may be constituted by, in place of the torque converter 22, by another fluid transmission device such as a fluid coupling device without a function of torque boost effect. Moreover, the fluid transmission device does not necessarily have to be provided but may be replaced by a starting clutch, for example.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
14: drive wheels
20: K0 clutch (clutch)
24: automatic transmission (transmission)
56: hydraulic control unit
70: engine speed sensor (sensor)
76: MG speed sensor(sensor)
90: electronic control apparatus (control apparatus)
92c: engine-start control portion
94: clutch control portion
98: cranking determination portion
MG: electric motor

What is claimed is:

1. A control apparatus for a vehicle that includes: an engine; drive wheels; an electric motor connected to a power transmission path between the engine and the drive wheels, in a power transmittable manner; a clutch disposed between the engine and the electric motor in the power transmission path; and a hydraulic control unit configured to supply a regulated hydraulic pressure that is to be used for switching an operation state of the clutch, the control apparatus comprising:
a clutch control portion that is configured, when the engine is to be started, to output a packing hydraulic-pressure command value and a cranking hydraulic-pressure command value that is higher than the packing hydraulic-pressure command value, such that the packing hydraulic-pressure command value is outputted to the hydraulic control unit, for regulating the hydraulic pressure so as to place the clutch in a pack-clearance-elimination completion state in which a pack clearance of the clutch has been eliminated, in a process of switching of the operation state of the clutch from a released state to an engaged state, and such that the cranking hydraulic-pressure command value is outputted to the hydraulic control unit, after elapse of a predetermined time required to place the clutch in the pack-clearance-elimination completion state, for regulating the hydraulic pressure so as to cause the clutch to transmit a cranking torque required by a cranking by which a rotational speed of the engine is increased, and
an engine-start control portion that is configured, when the engine is to be started, to control the electric motor for causing the electric motor to output the cranking torque, and to control the engine for starting the engine,
wherein the clutch control portion is configured, in a case in which it is determined that the cranking is required by a request requesting an increase of a power performance of the vehicle during output of the packing hydraulic-pressure command value, to output the cranking hydraulic-pressure command value in place of the packing hydraulic-pressure command value even before the elapse of the predetermined time.

2. The control apparatus according to claim 1,
wherein the clutch control portion is configured, in a case in which the cranking hydraulic-pressure command value is outputted before the elapse of the predetermined time, to output a surge hydraulic-pressure command value that is higher than the cranking hydraulic-pressure command value, such that the surge hydraulic-pressure command value is outputted to the hydraulic control unit temporarily upon initiation of output of the cranking hydraulic-pressure command value, for increasing responsiveness of the hydraulic pressure.

3. The control apparatus according to claim 2,
wherein the clutch control portion is configured to set the surge hydraulic-pressure command value higher and/or to set a time of output of the surge hydraulic-pressure command value longer, in a case in which a duration time of the output of the packing hydraulic-pressure command value is shorter than in another case, than in the another case.

4. The control apparatus according to claim 1,
wherein the engine-start control portion is configured to set, based on delay of response of the hydraulic pressure, a delay time from initiation of the output of the cranking hydraulic-pressure command value until initiation of output of the cranking torque by the electric motor, and
wherein engine-start control portion is configured to set the delay time longer in a case in which the cranking hydraulic-pressure command value is outputted before the elapse of the predetermined time than in a case in which the cranking hydraulic-pressure command value is outputted after the elapse of the predetermined time.

5. The control apparatus according to claim 4,
wherein the engine-start control portion is configured, in the case in which the cranking hydraulic-pressure command value is outputted before the elapse of the predetermined time, to set the delay time longer in a case in which a duration time of the output of the packing hydraulic-pressure command value is shorter than in another case, than in the another case.

6. The control apparatus according to claim 1,
wherein the clutch control portion is configured, in a case in which the cranking hydraulic-pressure command value is outputted before the elapse of the predetermined time, to output a surge hydraulic-pressure command value which is higher than the cranking hydraulic-pressure command value and which is dependent on a duration time of the output of the packing hydraulic-pressure command value, such that the surge hydraulic-pressure command value is outputted to the hydraulic control unit temporarily upon initiation of output of the cranking hydraulic-pressure command value, for increasing responsiveness of the hydraulic pressure,
wherein the engine-start control portion is configured to set, based on delay of response of the hydraulic pressure, a delay time from the initiation of the output of the cranking hydraulic-pressure command value until initiation of output of the cranking torque by the electric motor, such that the delay time is set to a value that is dependent on a duration time of the output of the packing hydraulic-pressure command value in a case in which the cranking hydraulic-pressure command value is outputted before the elapse of the predetermined time,
wherein the value of the delay time set by the engine-start control portion is smaller in a first case in which the surge hydraulic-pressure command value is higher in level than in a second case, than in the second case, as long as a time of output of the surge hydraulic-pressure command value is the same in the first and second cases, and
wherein the value of the delay time set by the engine-start control portion is smaller in a third case in which the time of the output of the surge hydraulic-pressure command value is longer than in a fourth case, than in the fourth case, as long as the surge hydraulic-pressure command value is the same in level in the third and fourth cases.

7. The control apparatus according to claim 1,
wherein the predetermined time is divided into a plurality of packing periods, and an output-initiation time point is determined in each one of the plurality of packing periods, for a case in which the cranking hydraulic-pressure command value is to be outputted before the elapse of the predetermined time, and
wherein, in the case of outputting the cranking hydraulic-pressure command value before the elapse of the predetermined time, the clutch control portion is configured to initiate outputting the cranking hydraulic-pressure command value at the output-initiation time point that is determined in one of the plurality of packing periods that includes a time point at which it is determined that the cranking is required.

8. The control apparatus according to claim 1,
wherein the clutch control portion is configured, when placing the clutch in the pack-clearance-elimination completion state, to output a quick-filling hydraulic-pressure command value that is higher than the packing hydraulic-pressure command value, such that the quick-filling hydraulic-pressure command value is outputted to the hydraulic control unit, prior to the output of the packing hydraulic-pressure command value, for regulating the hydraulic pressure so as to increase responsiveness of the hydraulic pressure, and
wherein the clutch control portion is configured, in a case in which it is determined that the cranking is required during output of the quick-filling hydraulic-pressure command value, to output the cranking hydraulic-pressure command value without outputting the packing hydraulic-pressure command value, such that the output of the quick-filling hydraulic-pressure command value is followed by output of the cranking hydraulic-pressure command value.

9. The control apparatus according to claim 1, further comprising:
a cranking determination portion configured to determine whether the cranking is required depending on whether the request requesting the increase of the power performance of the vehicle has been made or not,
wherein the request requesting the increase of the power performance of the vehicle includes an operation executed by a driver of the vehicle for increasing a drive request amount requested to the vehicle, and/or an operation executed by the driver of the vehicle for selecting a predetermined running mode that prioritizes the power performance rather than a fuel economy performance.

10. The control apparatus according to claim 9,
wherein the vehicle further includes a transmission disposed between the electric motor and the drive wheels in the power transmission path,
wherein the cranking determination portion is configured to select one of the request requesting the increase of the power performance of the vehicle and a request requesting the cranking to be delayed, such that the selected one has higher priority than the other,
wherein the cranking determination portion is configured to determine whether the request requesting the increase of the power performance of the vehicle has been made or not, depending on whether the request requesting the increase of the power performance of the vehicle has been selected as the selected one, and
wherein the request requesting the cranking to be delayed includes a request to avoid shifting of the transmission and the switching of the operation state of the clutch from being executed in an overlapping manner.

11. The control apparatus according to claim 10,
wherein the vehicle further includes a sensor configured to detect a signal value that is to be used for controlling start of the engine, and
wherein the cranking determination portion is configured, in event of failure of the sensor, to determine that the cranking is required, irrespective of presence or absence of the request requesting the increase of the power performance of the vehicle and the request requesting the cranking to be delayed.

12. The control apparatus according to claim 1,
wherein the clutch includes a first member that is to be rotated with rotation of the engine and a second member that is to be rotated with rotation of the electric motor, and
wherein a clearance between the first and second members of the clutch is eliminated when the clutch is placed in the pack-clearance-elimination completion state.

* * * * *